United States Patent [19]

MacGregor

[11] Patent Number: 5,423,697

[45] Date of Patent: Jun. 13, 1995

[54] MODULAR COMMUNICATIONS CONNECTOR FOR I/O CARD APPLICATIONS

[75] Inventor: Duncan D. MacGregor, Shingle Springs, Calif.

[73] Assignee: Intel Corporation, Santa Clara, Calif.

[21] Appl. No.: 249,290

[22] Filed: May 26, 1994

[51] Int. Cl.[6] .................................... H01R 25/00
[52] U.S. Cl. ................................. 439/638; 439/76; 439/928
[58] Field of Search ............................... 439/638–655, 439/62, 59, 65, 78, 79, 630–637, 928, 928.1, 76

[56] References Cited

U.S. PATENT DOCUMENTS

| | | | |
|---|---|---|---|
| 5,050,041 | 9/1991 | Shafi | 439/928 |
| 5,139,439 | 8/1992 | Shie | 439/928 |
| 5,183,404 | 2/1993 | Aldous et al. | |

FOREIGN PATENT DOCUMENTS 2115989  9/1983  United Kingdom ............... 439/928

OTHER PUBLICATIONS

No author, *PCMCIA, Personal Computer Memory Card International Association PC Card Standard, Release* 2.0, 3–13 through 3–26 (Sep. 1991).

No author, *PCMCIA Recommended Extensions, Release* 1.00, 1–3 through 1–8 (1992).

*Primary Examiner*—David L. Pirlot
*Attorney, Agent, or Firm*—Blakely, Sokoloff, Taylor & Zafman

[57] ABSTRACT

A modular communications connector apparatus for coupling an external communications device to the auxiliary I/O contacts of an IC card receptacle of a computer system is described. The apparatus includes a communications adapter receptacle, affixed to the computer chassis, which includes electrical contacts which are coupled to the auxiliary I/O contacts of the IC card receptacle. The apparatus also includes at least one communications adapter module which serves as an intermediate adapter between the communications adapter receptacle and one of a variety of standard communications plugs. To form the desired interface, the standard communications plug of the external device is inserted into a standard receptacle contained on communications adapter module, and the communications adapter module is then inserted into the communications adapter receptacle. Flexibility is achieved because the communications adapter receptacle is capable of receiving a variety of differently-adapted communications adapter modules.

16 Claims, 6 Drawing Sheets

MODULAR COMMUNICATIONS CONNECTOR FOR I/O CARD APPLICATIONS

CROSS-REFERENCE TO RELATED APPLICATIONS

The following co-pending U.S. patent applications relate to the present application. Each of the listed co-pending applications are assigned to the same assignee as the present application.
1) U.S. patent application Ser. No. 08/009,135, Filed Jan. 26, 1993, and titled, "METHOD AND APPARATUS FOR PROPAGATING SIGNALS ON INTEGRATED CIRCUIT CARDS"
2) U.S. patent application Ser. No. 08/243,228, Filed May 13, 1994, and titled, "INTEGRAL EXTERNAL CONNECTOR INTERFACE FOR THIN FORM FACTOR COMPUTER CARDS"
3) U.S. patent application Ser. No. 08/241,722, Filed May 12, 1994, and titled, "INTERCONNECTION SCHEME FOR INTEGRATED CIRCUIT CARD WITH AUXILIARY CONTACTS"
4) U.S. patent application Ser. No. 08/234,481, Filed Apr. 28, 1994, and titled, "KEYING NOTCHES FOR SIDE CONTACTS ON A THIN FORM FACTOR COMPUTER CARD"

FIELD OF THE INVENTION

The present invention relates to the field of portable computers and their associated peripheral devices. Particularly, the present invention relates to an apparatus for allowing the transfer of signals among one or more credit-card sized integrated circuit cards, the portable computer, and one or more external devices.

BACKGROUND OF THE INVENTION

Portable computers have recently become more powerful while at the same time becoming lighter and smaller. Peripheral devices are often used in conjunction with the portable computer to provide increased functionality, such as communications ability or enhanced data storage. One example of a peripheral device is a modem, which allows a user of a portable computer to communicate with other computers using telephone lines. Reduction in the size of peripheral devices has accompanied reductions in the size of portable computers.

Some portable computer systems and peripheral devices, modems in particular, have been designed recently such that the peripheral device is contained on a thin form factor computer card which plugs into a socket recessed within the body of the computer. Such peripheral devices can be carried along with the portable computer and inserted when needed.

Historically, each of the peripheral devices (e.g. modems, memory devices, facsimile, LANs, etc.) has required its own interface circuitry for connecting to the internal circuitry of a portable computer. This interface circuitry required a separate socket for each device, and thus more space in the portable computer. For example, a modem card and a memory card each required a separate socket, and thus two sockets were necessary even though only one was in use at a given time.

Recently, devices have been devised which allow some of these various forms of computer components to be plugged into the same socket of the computer, thereby reducing space required within the portable computer. For example, an international standard which defines the physical and electrical interface specifications for the interchangeability of memory and input/output cards was introduced by the Personal Computer Memory Card International Association (PCMCIA) jointly with the Japanese Electrical Industry Association (JEIDA) in September of 1991. In addition, a specification referred to as an Exchangeable Card Architecture (ExCA) specification, dated Dec. 20, 1991, has been issued by Intel Corporation of Santa Clara, Calif. The ExCA document describes specifications which manufacturers may use to provide interfaces which are ensured of allowing the memory and input/output cards for portable personal computers of different manufacturers to be interchanged.

A socket designed to these specifications allows cards, such as modem and flash memories, to be inserted, used, and removed interchangeably in the same socket. The computer systems used typically contained at least one socket recessed within the computer, such that the inserted computer card containing the modem, flash memory, etc., is protected by the body of the computer surrounding the socket in which the components are coupled.

The PCMCIA specification provides that the personal computer cards have a 68-pin connector located at the end of the card for transmitting signals between the computer and the card. Many system manufacturers desire to connect to critical signals on the integrated circuit card which are not available through the 68-pin connector. One example of such a need is found when the computer card is a modem card, in which case tip-ring connections between an external RJ11 jack and the modem card are needed. Such connections have typically been achieved through a second connector located along the rear edge of the computer card, i.e. the edge which faces to the outside of the computer which the card is inserted. This rear edge is opposite the 68-pin standard interface.

Another method of transferring external signals to a computer card, which can replace or be additive to the rear connectors, is described in a co-pending application, Ser. No. 08/009,135, "Method and Apparatus for Propagating Signals on Integrated Circuit Cards", applicant David C. Scheer, filed Jan. 26, 1993, and assigned to the assignee of the present invention. The "sideswipe" invention disclosed in the above pending application can provide tip-ring connections to a modem card, for example, through embedded contacts in the side of the computer card receptacle. One advantage of such a configuration is, for example, the elimination of the need to directly attach an external connector to the rear of the inserted modem card.

A problem which exists in the side-contacting scheme is the need for flexible interconnectability of computer cards and external connector types with the computer card receptacles built into the body of the computer. For example, a given computer card receptacle may be hardwired for a given type of external communications connector, e.g. where a computer card receptacle designed for use with one-line modem side-contacting cards contains two side contacts which are hardwired to an RJ11 jack in the computer chassis. In such a circumstance the alternative uses of this computer card receptacle are limited. If, for example, a two-line modem card were needed, necessitating a two-line RJ45 external connection, the given computer card receptacle in the above example would not be sufficient, and an alternative or separate computer card receptacle/external connector configuration would be required. Even with the addition of a second computer card receptacle/external connector, however, the types of external connections possible would be limited to the RJ11 and RJ45 types. If, for example, a side-contact computer card were used which was a sound card requiring a stereo audio miniplug interface, the existing RJ11 and RJ45 configurations would not suffice.

Thus, there exists a need for flexibility and interchangeability in the implementation of portable computer systems containing one or more receptacles for use with side-contact computer cards. The addition of extra receptacles and hardwired external connections is not a flexible, generalized solution to the situation where different types of side contact cards, necessitating different types of external communications connections, are desired for use in a portable computer system.

SUMMARY OF THE INVENTION

It is thus an object of the present invention to allow a flexible, user-configurable external communications interface to be achieved in a portable computer system containing one or more computer card receptacles designed for side-contact computer cards.

This object and other objects of the invention are provided for by a modular communications receptacle in a computer system capable of use with removably insertable integrated circuit (IC) cards, the computer system having an IC card receptacle coupled to the chassis for receiving and housing the body of a removably insertable IC card, the IC card receptacle being adapted for use with removably insertable IC cards having both a standard primary electrical interface for coupling to a bus means of the computer and an auxiliary electrical interface for coupling to an external device, the IC card receptacle having a primary connector for coupling to the standard primary electrical interface of the removably insertable IC card, the IC card receptacle having an auxiliary connector for coupling to the auxiliary electrical interface of the removably insertable IC card. The modular communications connector includes a communications adapter receptacle mechanically coupled to the chassis of the computer, the communications adapter comprising at least one electrical contact coupled to the auxiliary connector of the IC card receptacle. The modular communications connector further includes a first communications adapter module for use in coupling the communications adapter receptacle to a first external device having a communications connector of a first type, the first communications adapter module being removably insertable into the first communications adapter receptacle, the first communications adapter module comprising at least one electrical contact for coupling to at least one electrical contact of the first communications adapter receptacle upon insertion of the first communications adapter module into the first communications adapter receptacle, the first communications adapter module further comprising a communications interface coupled to at least one electrical contact of the first communications adapter module and being formed to be capable of attachment to the communications connector of the first type, wherein a first electrical communication path is established between an auxiliary electrical interface of a first removably insertable IC card and the first external device upon (1) insertion of the first removably insertable IC card into the first IC card receptacle, (2) insertion of the first communications adapter module into the first communications adapter receptacle, and (3) attachment of the communications connector of the first external device to the first communications adapter module. The first communications adapter module may be interchangeable with a second communications adapter module which is compatible with a second external device having a communications connector of a second type, the second external device corresponding to a different IC card, and thus the same IC card receptacle and communications adapter receptacle may be used with different IC cards and external devices. In one embodiment of the invention, there may be a plurality of IC card receptacles, each coupled to a corresponding communications adapter receptacle, wherein a given IC card/external device combination may be utilized in conjunction with any of the IC card receptacle/communications adapter receptacle combinations.

DETAILED DESCRIPTION OF THE PRESENT INVENTION

A modular communications connector for input/output applications in a portable computer system is now described. In the following description, numerous details are set forth such as specific types of I/O receptacles, specific numbers of pins and electrical contacts, sizes of receptacles, types of computer card applications, etc., in order to provide a thorough understanding of the present invention. It will be apparent, however, to one skilled in the art that the present invention may be practiced without these specific details. In other instances, well-known structures and devices are shown in block diagram form, rather than in detail, in order to avoid unnecessarily obscuring the present invention.

The present invention is advantageously employed in computer system design optimized for applications with lower power consumption and compact size. Such applications typically include small battery-powered personal computers of the type commonly referred to as laptops and notebooks. One such computer system is briefly described below; however, it is to be understood that the present invention is not limited to this particular computer system design and may be incorporated into virtually any processor-based system design.

Figure 1:
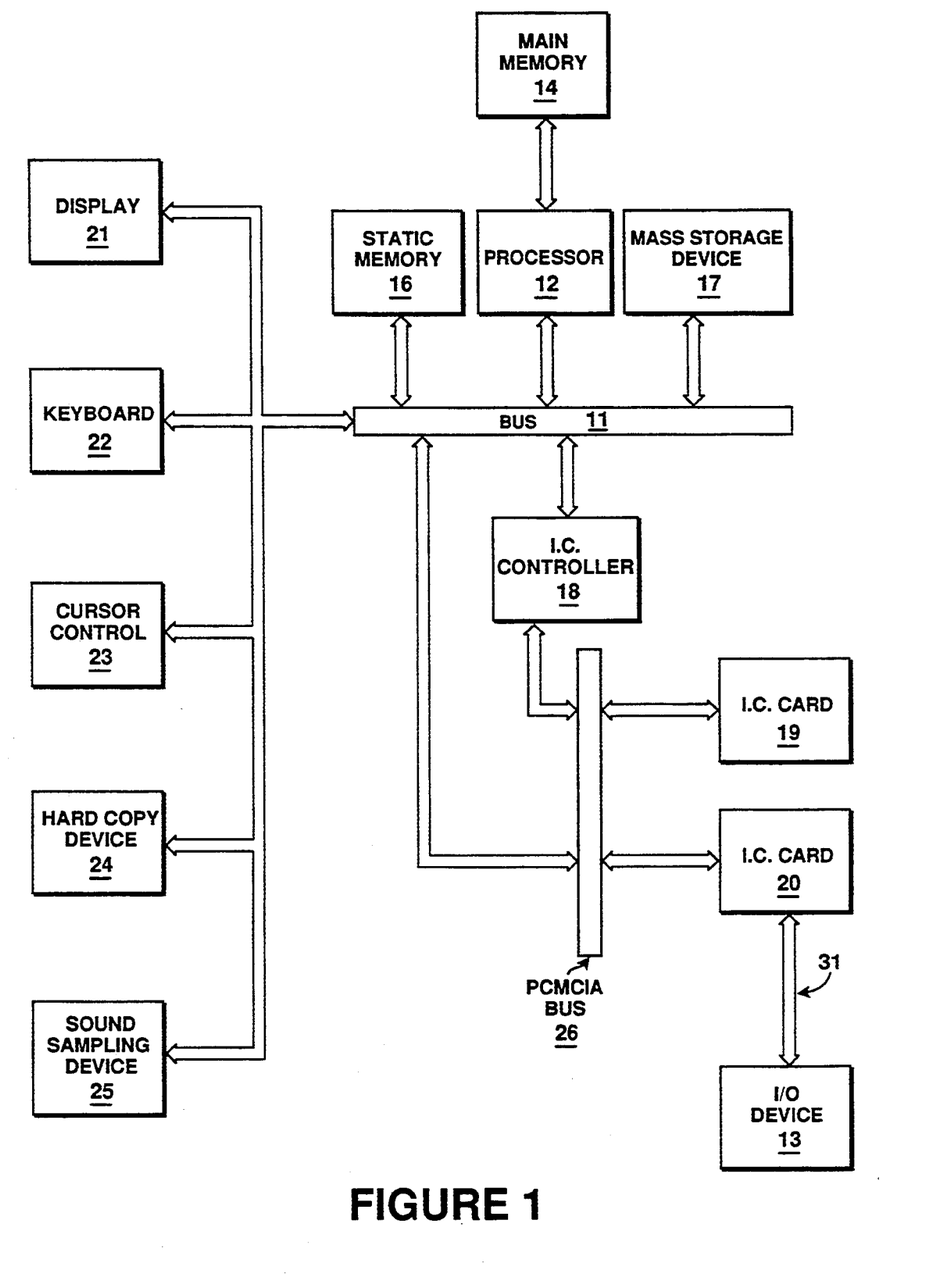
FIG. 1 illustrates a block diagram of the computer system of the present invention.

FIG. 1 shows a block diagram of a computer system in which the present invention is advantageously employed. The computer system as may be utilized with the preferred embodiment of the present invention generally comprises a bus for communication means 11 for communicating information, processing means 12 coupled to bus 11 for processing information, a random access memory (RAM) or other dynamic storage device 14 coupled with processing means 12 for storing information and instructions for processing means 12, a read only memory (ROM) or other non-volatile storage device 16 coupled with bus 11 for storing non-volatile information and instructions for processing means 12, a data storage device 17, such as a magnetic disk or disk drive, coupled with bus 11 for storing information and instructions, a display device 21, such as a cathode ray tube, liquid crystal display, etc., coupled to bus 11 for displaying information to the computer user, an alphanumeric input device 22 including alpha-numeric and other keys, etc., coupled to bus 11 for communicating information and command selections to processor 12, a cursor control 23 coupled to bus 11 for controlling cursor movement, a hard copy device 24, such as a plotter of printer, for providing visual representation of the computer images, hard copy device 24 being coupled with processor 12, main memory 14, non-volatile storage device 16 and mass storage device 17 through bus 11, and a sound recording and playback device 25 coupled to bus 11 for providing audio recording and playback.

Integrated circuit cards 19 and 20 are included in the computer system and are coupled to PCMCIA bus 26. Note that although the computer system only shows two IC cards, the number of IC cards which may be coupled to the computer system may vary. In the currently preferred embodiment, IC cards 19 and 20 are PCMCIA cards. PCMCIA bus 26 is coupled to bus 11 and to integrated circuit (IC) controller 18 for providing communication information between cards 19 and 20 and the remainder of the computer system. In the currently preferred embodiment, PCMCIA bus 26 is a standard PCMCIA bus for communicating information according to the PCMCIA standard. Note that although IC cards 19 and 20 and PCMCIA bus 26 of the present invention communicate according to the PCMCIA standard, other interface types and configurations fall within the scope of the present invention. IC controller 18 provides control and address information to IC cards 19 and 20 via PCMCIA bus 26 and is coupled to bus 11. Also note that although the cards are shown coupled to PCMCIA bus 26, in the currently preferred embodiment the cards are not coupled to PCMCIA bus 26 until they are inserted into slots in the side of the computer, such that their standard main interface (e.g., the 68 pin PCMCIA standard interface) is mated with the interface pins (e.g., the 68 pins) within the computer system.

The computer system also includes a signal path or bus 31 (i.e., sideswipe contact bus) for communicating information to IC card 20 by other than its standard interface. In one embodiment, signal path/bus 31 may only transfer one signal, while in other embodiments, bus 31 provides the signal path for multiple signals. Note that IC card 19 may be coupled to a sideswipe contact bus as well.

Finally, the computer system includes input/output (I/O) device 13 for providing an input/output port or connector for the computer system. I/O device 13 is coupled to signal path/bus 31 for access to signals from IC card 20. In another implementation, I/O device 13 could also be coupled to bus 11 for communication with the remainder of the computer system. In one implementation, I/O device 13 comprises a jack or plug, such as an RJ11 jack, RJ45 jack or other proprietary or telephone port that is coupled to the PC chassis for input and output. In such a case the signal path/bus 31 represents tip-ring (T/R) telephone line paths. I/O device 13 can also include an infra-red antennae or a radio-frequency antennae or other communications device. Note that although only one I/O device is shown, the computer system may include multiple I/O devices, and multiple I/O devices may be coupled to a single IC card. The present invention relates to mechanical and electrical aspects of achieving at least a part of the bus 31, the present invention providing for a modular communications connector which is used in establishing flexible and adaptable connections between the I/O device 13 and the IC card 20, and between other external I/O devices and IC cards not shown in FIG. 1.

Of course certain implementations and uses of the present invention may not require that the computer system include all of the above components. For example in certain implementations a keyboard and cursor control device for inputting information to the system may not be required. In other implementations, it may not be required to provide a display device for displaying information. Also, some components may be coupled in other configurations. For instance, main memory 14 may be coupled directly to bus 11 instead of being coupled to processor 12 directly.

It is emphasized that the following description of the present invention does not limit the possible applications of the IC cards 19 and 20. In the following descriptions a modem application is described. However, the invention is not so limited to a modem application, but can include any IC card functionality which requires coupling to external electrical signals which are not provided through the standard primary interface of the IC card (the 68-pin interface in a PCMCIA application). For example, the external electrical signals may be those associated with the IC card being a wireless communication device (e.g. antenna signals).

Figure 2:
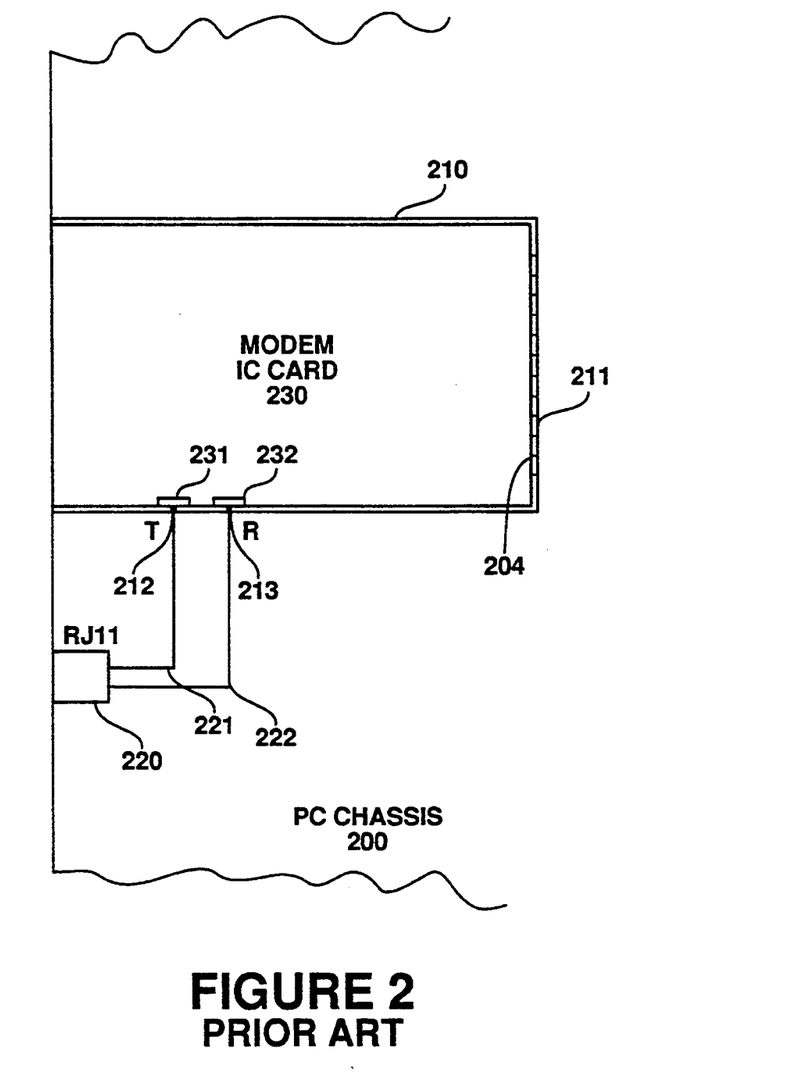
FIG. 2 illustrates a prior art configuration employed for interconnecting an IC card with auxiliary side contacts to a computer system and to a corresponding external communications device.

FIG. 2 illustrates a configuration currently employed for achieving the physical and electrical interconnection of an IC card with side contacts in a computer system. As shown in FIG. 2, a computer chassis 200 includes an IC card receptacle 210 and a female RJ11 connector 220. IC receptacle 210 includes a standard PCMCIA card interface 211 and two side contacts 212 and 213 which, in the configuration shown, represent the tip (T) and ring (R) contacts for an inserted modem IC card 230. The tip side contact 212 couples to the corresponding tip side contact 231 of the modem IC card 230. The ring side contact 213 couples to the corresponding ring side contact 232 of the modem IC card 230. The side contacts 212 and 213 are coupled to the RJ11 connector 220 via leads 221 and 222, respectively. In use, an external male RJ11 plug is plugged into the female RJ11 connector 220 to provide external tip and ring connections.

It is seen from FIG. 2 that the IC receptacle 210 together with the female RJ11 jack 220 affixed to the chassis 200 is limited in its application to a single-line application. In a case where a two-line configuration or other communication function is needed, requiring additional side receptacle contacts and requiring an RJ45 connector instead of an RJ45 connector, an entirely separate or alternative IC card receptacle and communications interface would be needed. It is desired to provide an IC receptacle and communications interface in a configuration flexible enough so as to not require entirely separate or alternative IC card receptacle and communications interfaces when the number of communication leads and the type of external connector (e.g. RJ11 versus RJ45) are varied. Additionally, where there are multiple IC card receptacles present, it is desired to be able to interchange their functionality with respect to the types of IC cards and external communications connectors used.

Figure 3:
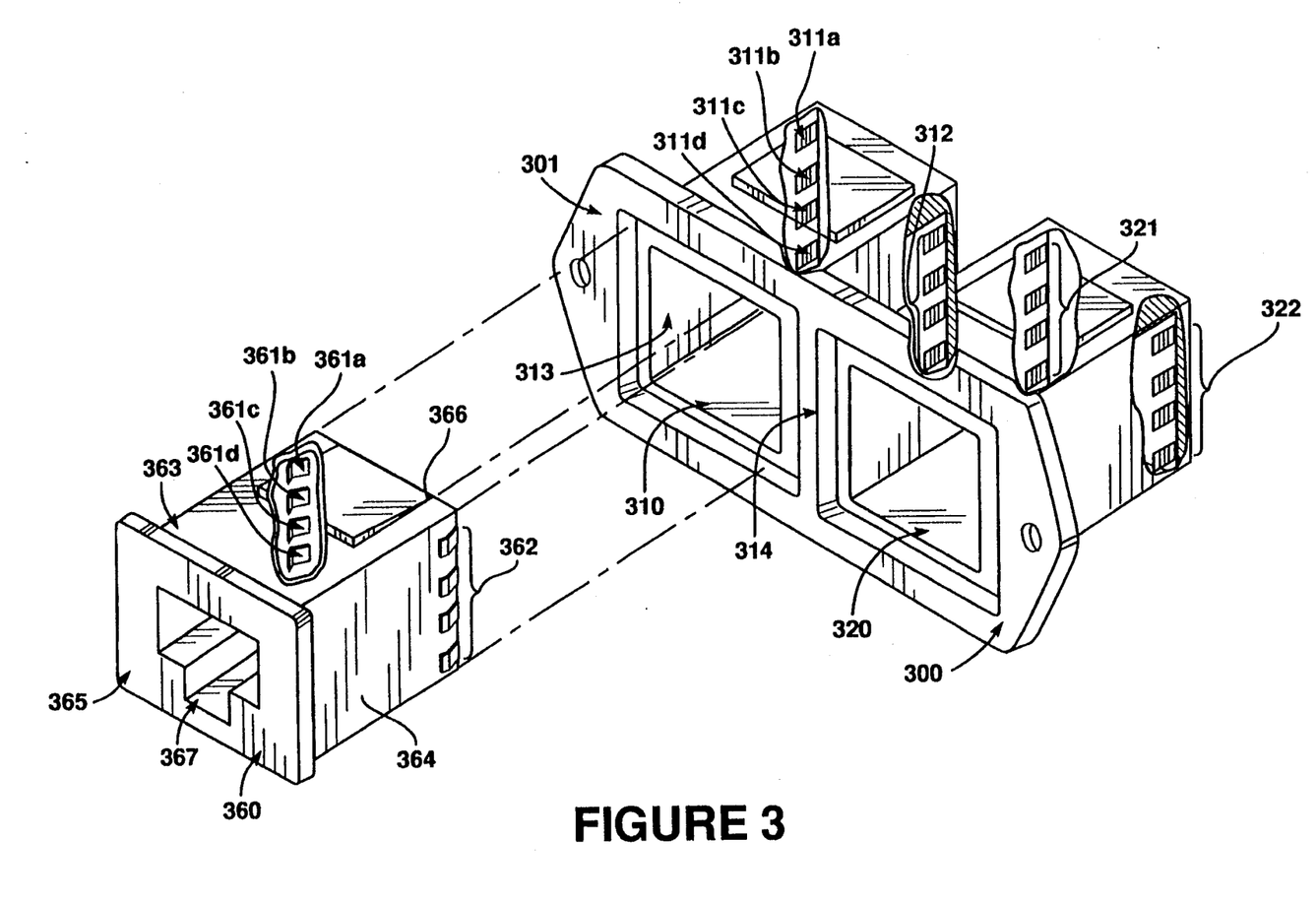
FIG. 3 shows a modular communications connector in accordance with a first embodiment of the present invention.

FIG. 3 shows a modular communications connector in accordance with a first embodiment of the present invention. The modular communications connector comprises a communications adapter receptacle frame 300 and a communications adapter module 360. The communications adapter receptacle frame 300 is constructed so as to be capable of being affixed to a computer chassis. It is noted that, while in the embodiment of the invention being described the communications adapter receptacle frame 300 is formed separately and then affixed to the computer chassis, the scope of the present invention also includes another embodiment in which the communications adapter receptacle frame 300 is integral with the computer chassis, i.e. formed into the computer chassis itself.

The communications adapter receptacle frame 300 is formed so as to comprise a first communications adapter receptacle 310 and a second communications adapter receptacle 320, as shown in FIG. 3. The communications adapter receptacle 310 is formed so as to be able to house the communications adapter module 360, which is removably insertable into the receptacle 310. Communications adapter receptacle 310 further comprises electrical contact sets 311 and 312 which are located near the rear of the receptacle along side surfaces 313 and 314, respectively, of the communications adapter receptacle 310. In the preferred embodiment of the invention electrical contact sets 311 and 312, each comprising 4 electrical contacts in a vertical arrangement. FIG. 3 thus shows electrical contacts 311a, 311b, 311c, and 311d along side wall 313. The electrical contact sets 311 and 312 are capable of being hardwired to the side contacts of an IC receptacle in the computer chassis. As shown in FIG. 3, communications adapter receptacle 320 is formed into the communications adapter receptacle frame 300 and comprises electrical contact sets 321 and 322 with functionality similar to the electrical contact sets 311 and 312 with the exception that these electrical contact sets are to be hardwired to the side contacts of a different IC receptacle. Thus, the modular communications connector of FIG. 3 is designed optimally for use in a computer containing two IC card receptacles.

The communications adapter module 360 as shown in FIG. 3 serves as an adapter between an external device containing a standard interface type and either of the communications adapter receptacles 310 and 320. The communications adapter module 360 comprises electrical contact sets 361 and 362 which are located along side walls 363 and 364, respectively. The communications adapter module 360 further comprises a first end 365 and a second end 366, the second end 366 leading during an insertion of the communications adapter module 360 into either of the receptacles 310 and 320. The first end 365 contains an opening for a communications interface 367.

Electrical contact set 361 comprises contacts 361a, 361b, 361c, and 361d arranged vertically along the side wall 363. Upon insertion into communications adapter receptacle 310, these four electrical contacts become coupled to the electrical contacts 311a, 311b, 311c, and 311d, respectively. Likewise, upon insertion of the communications adapter module 360 into the communications adapter receptacle 320, the electrical contacts 361a, 361b, 361c, and 361d become coupled to the electrical contacts 321a, 321b, 321c, and 321d, respectively. Similar contacts are made between electrical contacts 362 and 312 or 322.

Communications interface 367, in the present embodiment of the invention, comprises a well-known RJ11 female interface. Although the wiring details are not shown in FIG. 3 so as not to unnecessarily obscure the present invention, the tip and ring connections of the communications interface 367 are coupled to two of the eight electrical contacts 361a–d and 362a–d of the communications adapter module 360. The two contacts selected are not of importance provided, of course, that they correspond to two of the electrical contacts of the communications adapter receptacle, into which the communications adapter module 360 is inserted, which lead to the necessary contacts of the IC receptacle to which that communications adapter receptacle is wired.

It is important to note that the communications adapter module 360 represents one of a set of communications adapter modules which are to be usable and interchangeable into the communications adapter receptacles 310 and 320, depending on the application of the associated IC card to be inserted. Thus, although the communications interface 367 in FIG. 3 is an RJ11 connector, in other modules of the set this interface may be an RJ45 interface, an Ethernet twisted pair interface, a stereo audio miniplug interface, etc. In the present embodiment of the invention, the only limitation on the type of interface used is that it be limited to eight electrical contacts, because there are only eight electrical contacts (361/362) on the second end 365 of the communications adapter module 360. However, a communications adapter module (and corresponding communications adapter receptacle) containing a greater or a lesser number of electrical contacts is not outside the scope of the present invention.

Figure 4:
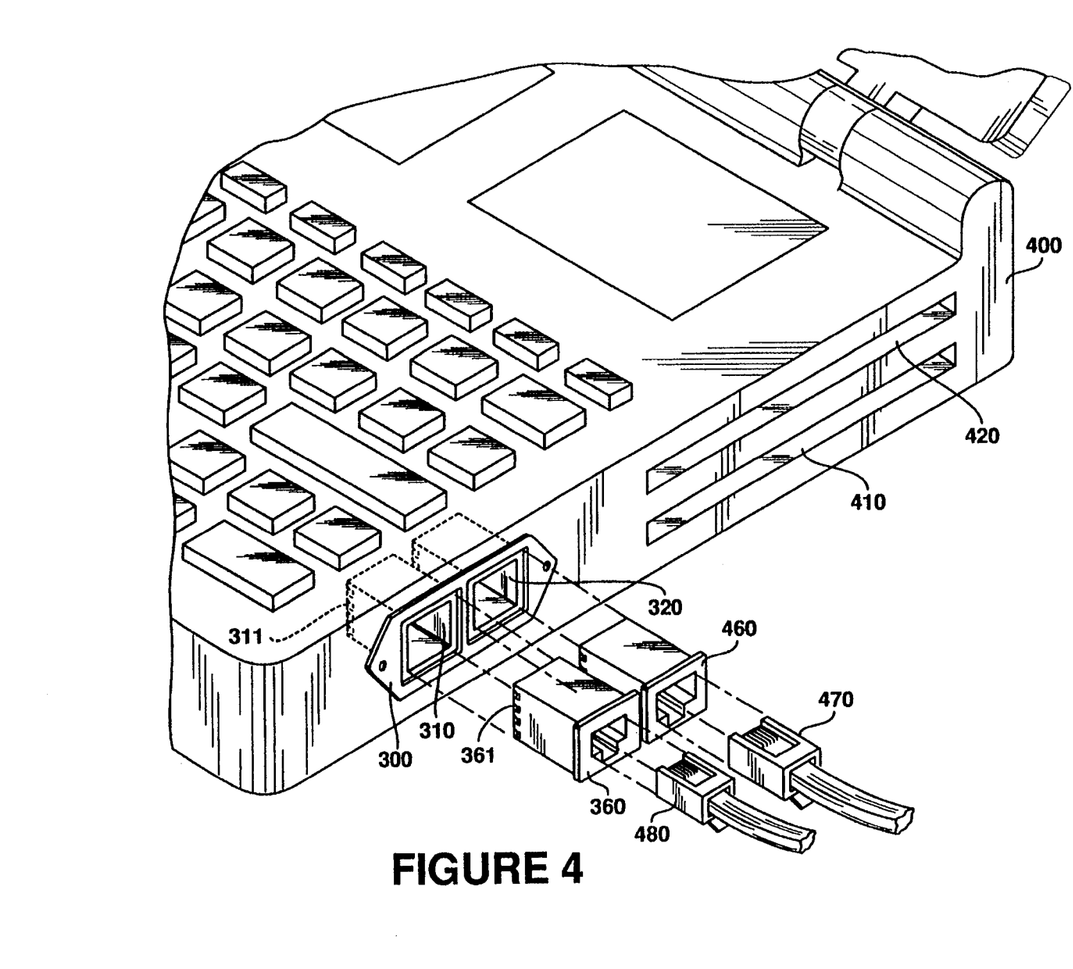
FIG. 4 illustrates a perspective view of a computer system comprising a modular communications connector in accordance with the first embodiment of the present invention.
Figure 5:
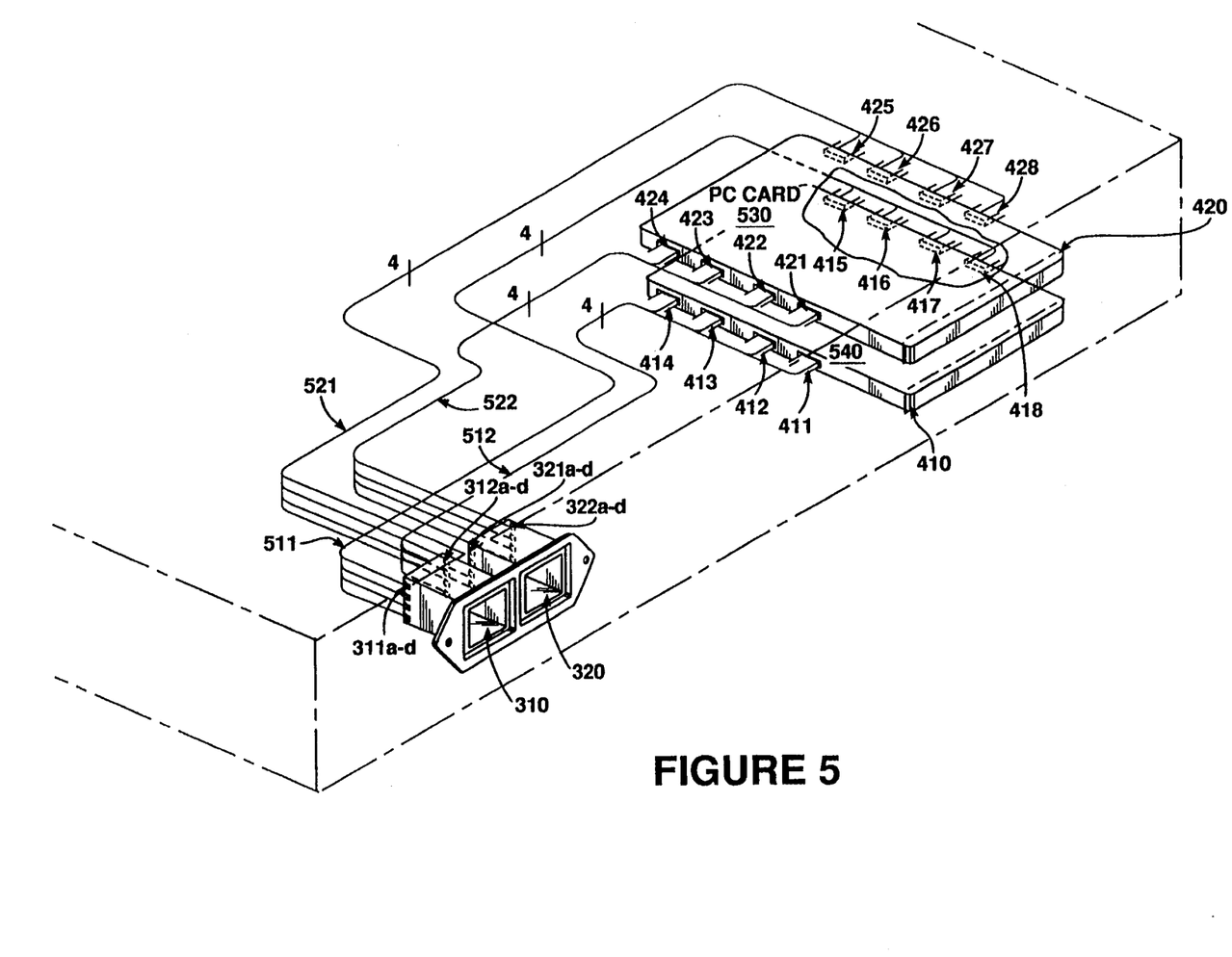
FIG. 5 shows a more detailed diagram of the computer system configuration shown in FIG. 4.

FIGS. 4 and 5 represent a portable computer system with a modular communications connector configured in accordance with the first embodiment of the present invention. FIG. 4 shows a portable computer 400 comprising a first IC card receptacle 410, a second IC card receptacle 420, the communications adapter receptacle frame 300, the first communications adapter module 360, and a second communications adapter module 460. The IC card receptacles 410 and 420 are adapted for use with IC cards with side contacts. The communications adapter receptacle frame 300 comprises communications adapter receptacles 310 and 320, the communications adapter receptacle 310 being hardwired to the IC receptacle 410, and the communications adapter receptacle 320 being hardwired to the IC receptacle 420. The connections used to achieve this interconnection are shown in FIG. 5.

As shown in FIG. 4, the communications adapter module 360 comprises an RJ11 connector, whereas the communications adapter module 460 comprises an RJ45 connector. Thus, a single-line modem IC card is to be used in conjunction with communications adapter module 360, whereas a two-line modem or network IC card is capable of being used in conjunction with communications adapter module 460. For contemporaneous use of both IC cards in the system, the user inserts communications adapter module 360 into communications adapter receptacle 310, connects an external RJ11 plug 480 carrying tip and ring signals into the communications adapter module 360, and inserts the associated single-line modem IC card into IC card receptacle 410. The user also inserts communications adapter module 460 into communications adapter receptacle 320, connects an external RJ45 plug 470 carrying network signals or T/R and T1/R1 signals into the communications adapter module 460, and inserts the associated single-line modem IC card into IC card receptacle 420.

However, it is noted there is significant interchangeability. That is, the user may just as well use communications adapter receptacle 310 in conjunction with the communications adapter module 460, and insert the network or two-line modem IC card into IC card receptacle 410, and may use communications adapter receptacle 320 in conjunction with the communications adapter module 360, and insert the single-line modem IC card into IC card receptacle 410.

FIG. 5 shows a diagram of the computer system of FIG. 4 including the wiring between the communications adapter receptacles and the IC card receptacles. FIG. 5 also shows, for illustrative purposes, two IC cards 530 and 540, each having eight side contacts, inserted into the IC card receptacles 420 and 410, respectively. Each IC card receptacle contains substantially identical side contact regimes. The IC card receptacle 410 includes eight auxiliary side contacts which together form an auxiliary connector for coupling to the side contacts of an inserted IC card containing one to eight corresponding side contacts. In FIG. 5, IC card 540 has eight side contacts (only two of which, if IC card 540 were a single-line modem card, would be present or active). In the present embodiment the IC card receptacle 410 comprises auxiliary side contacts 411, 412, 413, and 414 along a first side of the IC card receptacle 410, and auxiliary side contacts 415, 416, 417, and 418 along a second side of the IC card receptacle 410. As shown in FIG. 5, auxiliary side contacts 411–414 are coupled via a bus 512 to the electrical contacts 312a–d, respectively, of the communications adapter receptacle 310, while auxiliary side contacts 415–418 are coupled via a bus 511 to the electrical contacts 311a–d, respectively, of the communications adapter receptacle 310.

Also as shown in FIG. 5, IC card receptacle 420 comprises auxiliary side contacts 421, 422, 423, and 424 along a first side of the IC card receptacle 420, and auxiliary side contacts 425, 426, 427, and 428 along a second side of the IC card receptacle 420. As shown in FIG. 5, auxiliary side contacts 421–424 are coupled via a bus 522 to the electrical contacts 322a–d, respectively, of the communications adapter receptacle 320, while auxiliary side contacts 425–428 are coupled via a bus 521 to the electrical contacts 321a–d, respectively, of the communications adapter receptacle 320. Each of the auxiliary side contacts of the IC card receptacles 410 and 420 couple to a single side contact of the inserted IC cards 540 and 530, respectively.

It is noted that a removably insertable IC card such as IC card 530 or 540 for use in a system architecture according to the present invention requires appropriate spacing of its side contacts to conform to the side contacts of the receptacle. It is not necessary, however, for each IC card to contain the maximum number of electrical contacts; the IC cards may have anywhere from zero up to the maximum number (eight in FIG. 5) in order to be operable in the IC receptacles 410 and 420.

It is noted that the side contact regime of the IC cards must be coordinated with the appropriate communications adapter module in order to receive the correct external signals at the correct side contact locations. It is thus required for designated applications that IC cards and their associated communications adapter modules are designed with each other in mind.

Figure 6:
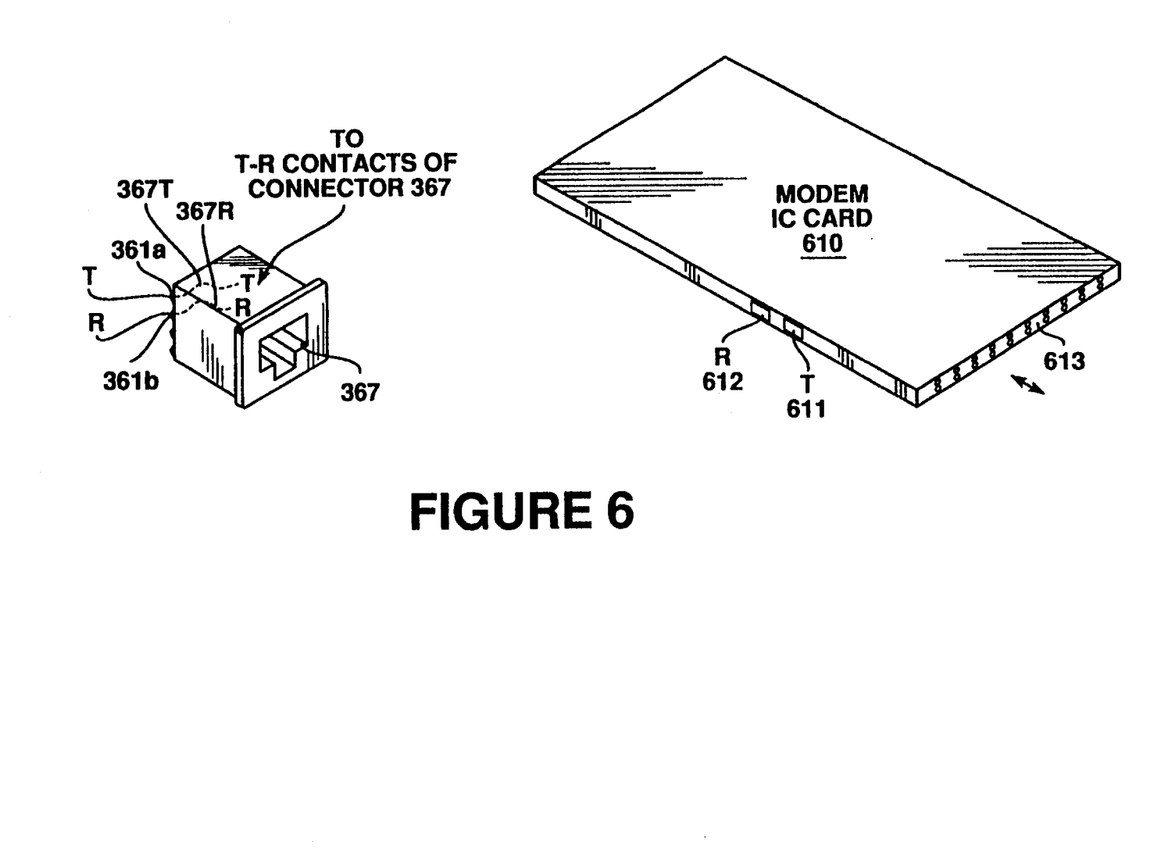
FIG. 6 illustrates a typical example of an IC card and communications adapter module pair corresponding to the computer and modular communications connector of FIGS. 4 and 5.

FIG. 6 shows such an example of an IC card/communications adapter module pairing which corresponds to the computer and modular communications connector shown in FIGS. 3 through 5. FIG. 6 shows a single-line modem IC card and the corresponding communications adapter module 360. The electrical contacts 361a and 361b are coupled to the tip and ring connections, respectively, of the communications connector 367 via leads 367T and 367R, respectively. In use in the system as shown in FIGS. 4 and 5, if the IC card 610 is to be inserted into IC card receptacle 410, for example, the tip and ring connections are achieved as follows. The user inserts the communications adapter module 360 into the communications adapter receptacle 310. In such a case, the tip connection will pass through electrical contact 361a, then through electrical contact 311a of the communications adapter receptacle 310, then through a lead of the bus 511 to the auxiliary contact 415 of the IC card receptacle 410. As shown in FIG. 6, the modem IC card 610 which corresponds to the communications adapter module 360 has a tip side contact at a front right location of the IC card, and thus is designed to couple to auxiliary contact 415 of the IC card receptacle 410, and the tip connection is achieved. The ring connection in this example is similarly achieved via elements 367R, 361b, 311b, a different bus 511 lead, auxiliary electrical contact 46, and IC card ring side contact 612.

There are several advantages in the computer system and modular communications connector of FIGS. 3–6 made in accordance with the present invention. The modular architecture of the modular communications connector allows several types of IC card/communications adapter modules to be used with the same IC card receptacle/communications adapter receptacle configuration, thus allowing maximum flexibility and interchangeability of side-contact IC cards which require external communications connections. Another advantage is that the present invention may serve as a platform for future side-contact IC card applications without the need for extensive computer chassis and IC receptacle modifications. Another advantage is a reliability factor increase in systems containing more than one IC card receptacle—if one IC card receptacle fails, another IC card receptacle may be used in its place with the same application and IC card simply by moving the IC card and its associated communications adapter module.

It will be apparent to one of ordinary skill in the art that the modular communications connector can be used in any configuration where I/O signals emanate Alternate means of connecting to these signals to the IC card (e.g., top, bottom, end) are also possible.

It is emphasized that the embodiment of the invention described uses two communications adapter receptacles and two IC card receptacles. It is to be noted that the scope of the invention is not so limited, and may include any number of communications adapter receptacles and IC card receptacles. It is further noted that complete interchangeability of receptacles is not required in the present invention—for example, it may be desirable, for electrical isolation or other special reasons, to incorporate one or more communications adapter receptacle/IC card receptacle combinations which are not compatible with the others. For example, a communications adapter receptacle may be associated with a special unique IC card receptacle and be of a special keyed shape which only accepts customized communications adapter modules keyed to that shape, so that the special unique IC card receptacle can be used only with a special customized IC card/communications adapter module combination. Such embodiments fall within the scope of the present invention.

It is furthermore noted that the embodiment of the invention described uses eight electrical contacts on the communications interface modules and the communications interface receptacles, as well as eight auxiliary electrical contacts on the auxiliary connectors of the IC card receptacles. The scope of the present invention, however, is not so limited, and any number of such electrical contacts on the communications interface modules and the communications interface receptacles falls within the scope of the present invention. Furthermore, the number of auxiliary electrical contacts on the present invention. Furthermore, the number of auxiliary electrical contacts on the auxiliary connectors of the IC card receptacles may vary as well, and may also exceed the number of electrical contacts on the communications interface receptacles. Such a case may be desired, for example, when adding customized capabilities to the otherwise interchangeably coupled IC card receptacle, that is, additional auxiliary electrical contacts may be present on the IC card receptacle which lead to interfaces other than the modular communications receptacle.

Thus, a modular communications connector for input/output applications in a portable computer system has been described. Whereas many alterations and applications of the present invention will no doubt become apparent to a person of ordinary skill in the art after reading the foregoing description, it is understood that the particular embodiments shown and described by illustration are in no way intended to be limiting. Therefore, references to details of the preferred embodiments are not intended to limit the scope of the claims which themselves recite only those features regarded as essential to the invention.

I claim:

1. In a computer system having a card receptacle for receiving a circuit card, said circuit card being a removably insertable integrated circuit card, a modular data communications system for electrically coupling a detachable data communications adapter module to said circuit card, said modular data communications system comprising:

an adapter module receptacle electrically coupled to said card receptacle and electrically coupled to said circuit card upon insertion of said circuit card into said card receptacle; and a data communications adapter module being detachably insertable into said adapter module receptacle, said adapter module being electrically coupled to said adapter module receptacle when inserted into said adapter module receptacle, said adapter module being electrically coupled to said circuit card when said adapter module is inserted into said adapter module receptacle and upon insertion of said circuit card into said card receptacle, said adapter module including a communications interface receptacle for receiving a first one of a plurality of standard communications interface connectors.

2. The modular data communications system as claimed in claim 1 further including:

an alternate data communications adapter module being detachably insertable into said adapter module receptacle, said alternate adapter module being electrically coupled to said adapter module receptacle when inserted into said adapter module receptacle, said alternate adapter module being electrically coupled to said circuit card when said alternate adapter module is inserted into said adapter module receptacle and upon insertion of said circuit card into said card receptacle, said alternate adapter module including a communications interface receptacle for receiving a second one of said plurality of standard communications interface connectors, said first one of said connectors being different from said second one of said connectors.

3. The modular data communications system as claimed in claim 1 wherein said circuit card is a PCMCIA card.

4. The modular data communications system as claimed in claim 1 wherein said first one of a plurality of standard communications interface connectors is an RJ11 type connector.

5. The modular data communications system as claimed in claim 1 wherein said first one of a plurality of standard communications interface connectors is an RJ45 type connector.

6. The modular data communications system as claimed in claim 1 wherein said first one of a plurality of standard communications interface connectors is an Ethernet twisted pair type connector.

7. The modular data communications system as claimed in claim 1 wherein said circuit card includes:

a primary electrical interface for coupling said circuit card to a bus of said computer system; and an auxiliary electrical interface for coupling said circuit card to one of a plurality of external devices, said auxiliary electrical interface being different from said primary electrical interface.

8. The modular data communications system as claimed in claim 7 wherein said adapter module receptacle is electrically coupled to said auxiliary electrical interface of said circuit card.

9. The modular data communications system as claimed in claim 1 wherein said circuit card includes:

a primary electrical interface for coupling said circuit card to a bus of said computer system;

a first auxiliary electrical interface for coupling said circuit card to a first one of a plurality of external devices; and a second auxiliary electrical interface for coupling said circuit card to a second one of said plurality of external devices, said first auxiliary electrical interface and said second auxiliary electrical interface each being different from each other and each being different from said primary electrical interface.

10. The modular data communications system as claimed in claim 9 wherein wherein said adapter module receptacle is electrically coupled to said first auxiliary electrical interface of said circuit card, said modular data communications system further including:

a second adapter module receptacle electrically coupled to said card receptacle and electrically coupled to said circuit card upon insertion of said circuit card into said card receptacle, said second adapter module receptacle being electrically coupled to said second auxiliary electrical interface of said circuit card.

11. The modular data communications system as claimed in claim 10 further including:

a second data communications adapter module being detachably insertable into said second adapter module receptacle, said second adapter module being electrically coupled to said second adapter module receptacle when inserted into said second adapter module receptacle, said second adapter module being electrically coupled to said circuit card when said second adapter module is inserted into said second adapter module receptacle and upon insertion of said circuit card into said card receptacle, said second adapter module including a communications interface receptacle for receiving a second one of said plurality of standard communications interface connectors, said first one of said connectors being different from said second one of said connectors.

12. A data communications adapter module comprising:

a card interface for detachably inserting said adapter module into an adapter module receptacle, said adapter module being electrically coupled to said adapter module receptacle when inserted into said adapter module receptacle, said adapter module being electrically coupled to a removably insertable integrated circuit card when said adapter module is inserted into said adapter module receptacle and upon insertion of said circuit card into a card receptacle; and a communications interface receptacle for receiving a first one of a plurality of standard communications interface connectors.

13. The data communications adapter module as claimed in claim 12 wherein said circuit card is a PCMCIA card.

14. The data communications adapter module as claimed in claim 12 wherein said first one of a plurality of standard communications interface connectors is an RJ11 type connector.

15. The data communications adapter module as claimed in claim 12 wherein said first one of a plurality of standard communications interface connectors is an RJ45 type connector.

16. The data communications adapter module as claimed in claim 12 wherein said first one of a plurality of standard communications interface connectors is an Ethernet twisted pair type connector.

* * * * *